(12) United States Patent
Ide et al.

(10) Patent No.: US 6,251,986 B1
(45) Date of Patent: Jun. 26, 2001

(54) PAINT RESIN EMULSION HAVING WEATHERABILITY

(75) Inventors: Hiroshi Ide; Motoyuki Takagi, both of Osaka (JP)

(73) Assignee: National Starch and Chemical Investment Holding Corporation, Wilmington, DE (US)

( * ) Notice: Subject to any disclaimer, the term of this patent is extended or adjusted under 35 U.S.C. 154(b) by 0 days.

(21) Appl. No.: 09/155,271
(22) PCT Filed: Jan. 7, 1998
(86) PCT No.: PCT/US98/00600
§ 371 Date: Dec. 11, 1998
§ 102(e) Date: Dec. 11, 1998
(87) PCT Pub. No.: WO98/34991
PCT Pub. Date: Aug. 13, 1998

(30) Foreign Application Priority Data

Feb. 7, 1997 (JP) .................................................... 9-024657

(51) Int. Cl.$^7$ .................................................... C09D 133/06
(52) U.S. Cl. ........................ 524/547; 525/100; 526/279; 524/548; 524/806; 524/808; 524/809
(58) Field of Search ............................ 525/100; 524/547, 524/548, 806, 808, 809; 526/279

(56) References Cited

U.S. PATENT DOCUMENTS

| | | | | |
|---|---|---|---|---|
| 4,528,311 | * | 7/1985 | Beard et al. | 524/91 |
| 4,839,405 | * | 6/1989 | Speelman et al. | 524/99 |
| 5,182,349 | * | 1/1993 | Okada et al. | 526/265 |
| 5,223,495 | * | 6/1993 | Inoue et al. | 524/188 |
| 5,344,880 | * | 9/1994 | Nambu et al. | 525/100 |
| 5,773,497 | * | 6/1998 | Ueyanagi et al. | 524/99 |

FOREIGN PATENT DOCUMENTS 475 149 A2 * 3/1992 (EP) .

OTHER PUBLICATIONS

JP 95–131611, abstract, 1996.*

* cited by examiner

Primary Examiner—Margaret G. Moore
(74) Attorney, Agent, or Firm—Thomas F. Roland

(57) ABSTRACT

To provide improved acrylic resin which has weatherability such as the gloss-retaining ability almost as good as that of the fluorine resin or silicone resin while maintaining the advantages of the conventional acrylic resin binder as paint resin such as the gloss or pigment dispersion stability. The emulsion is characterized in that it comprises in 100 wt. % of resin emulsion component thereof: (a) 0.1 to 10 wt. % of a monomer containing light stabilizing group; and (b) 0.1 to 10 wt. % of a monomer containing alkoxysilyl group. Preferably, it further comprises (c) 0.1 to 10 wt. % of monomer containing ultra-violet absorbent group.

5 Claims, No Drawings

PAINT RESIN EMULSION HAVING WEATHERABILITY

The present invention relates to a paint resin emulsion for use as an aqueous painter binder having improved weatherability. More particularly, the invention provides a resin emulsion having improved resistance against degradation due to exposure to ultra-violet or visible light. The resin emulsion according to the present invention will find a variety of applications including, but not limited to, application as a binder to be contained in paint for domestic electric appliances, steel-made machinery, large construction works, automobiles, building constructions, building materials, wood materials or the like.

In recent years, in consideration of the environmental pollution or effect on human body, there has been a general shift from solvent-based paint to water-based paint. In particular, water-based or aqueous paint using an acrylic resin emulsion as a binder has been often used because it satisfies the requirements as paint resin such as paint-film forming ability, adhesion to the substrate, pigment dispersion stability or the like.

However, as for a conventional acrylic resin emulsion paint, an accelerated weathering test using a sunshine meter conducted thereon has revealed that this resin can retain its gloss for approximately 100 hours only. Therefore, this type of resin has problem for application demanding a long-term weatherability. Then, in order to improve the long-term weatherability, the prior art has further suggested adding to the resin paint those additives generically referred to as anti-weathering agent such as ultra-violet absorbent for absorbing ultra-violet ray which significantly contributes to degradation of the molecular chain of the resin, antioxidant or the like.

Further, the Japanese laid-open patent gazette Hei. 3 (1991)-128978 discloses the technology of copolymerizing ultra-violet stabilizing monomers enabling to be polymerized.

In more recent years, fluorine resin, silicone resin or the like has been put into use as paint resin having improved long-term weatherability capable of retaining gloss as long as 4000 to 5000 hours as determined in the accelerated weathering test using the sunshine weather meter.

Notwithstanding the above, in the case of acrylic resin paint added with the anti-weathering agent, although some improvement may be recognized indeed in terms of the long-term weatherability, the resin still has the problem of poor durability against effusion due to e.g. rain after evaporation or bleed-out of the anti-weathering agent Then, in order to restrict such effusion, according to the art of the Japanese laid-open patent gazette Hei. 3 (1991)-128978 discussed supra, a trial for improvement was attempted by using a monomer containing cycloalkyl group as another essential component thereof. However, the level of the weatherability achieved with this attempt has proven still insufficient.

On the other hand, the fluorine resin and the silicone resin are inferior to the acrylic resin in the respect of such properties as gloss, pigment dispersion stability.

Then, the primary object of the present invention is to provide improved acrylic resin which has the gloss-retaining ability almost as good as that of the fluorine resin or silicone resin while maintaining the advantages of conventional acrylic resin paint binder such as the gloss-retaining ability or pigment dispersion stability.

In order to a ccomplish the above-noted object, the paint resin emulsion having improved weatherability, according to the present invention, comprises in 100 wt. % of the resin component in the emulsion thereof:

(a) 0.1 to 10 wt. % of a monomer containing light stabilizing group; and (b) 0.1 to 10 wt. % of a monomer containing alkoxysilyl group.

In the above, the light stabilizing group contained in such a monomer containing the light stabilizing group may be an amino group of a hydroxyl group surrounded by a bulky substituent having steric hindering effect, i.e. a functional group commonly referred to as a hindered amino group or hindered hydroxyl group. As such the light stabilizing group is bonded with a polymerizing unsaturated group, the monomer containing the light stabilizing group is formed.

Then, by copolymerization of such a monomer with the polymerized chain of the binder resin, there is obtained the paint resin emulsion which suffers less degradation from effusion due to rain after evaporation or bleeding-out of the anti-weathering agent therefrom and which yet provides improved weatherability due to the cross linking effect of the resin molecules.

Referring the above component (a), i.e. a monomer containing the light stabilizing group, if the amount of this monomer is present less than 0.1 wt. % in the resin, then, the monomer cannot provide its effect sufficiently. Conversely, an amount thereof greater than 10 wt. % will not provide any additional effect, only resulting in cost increase. Also, referring to the other component (b), if the amount of this component is less than 0.1 wt. %, the effect thereof will be insufficient. And, an amount thereof greater than 10 wt. % will only result in cost increase, without providing any additional effect.

According to the invention as set forth in claim 2, the construction of claim 1 further comprises the additional component (c), i.e. 0.1 to 10 wt. % of a monomer containing ultra-violet absorbent group.

Such a monomer containing the ultra-violet absorbent group as this component (C) is a compound capable of contributing to further improvement of weatherability by absorbing ultra-violet ray which can excite and cut off the chemical bond of the resin molecules. Then, by addition of this further component (c), the weatherability may be further improved.

Like the amount of the components (a) and (b) discussed above, if the amount of the component (c) is smaller than the lower limit of 0.1 wt. %, the component cannot provide its effect sufficiently and an amount thereof greater than 10 wt. % will only result in cost increase, without providing any additional effect.

Preferably, a monomer containing the light stabilizing group is represented by the following chemical formula (chemical formula 4):

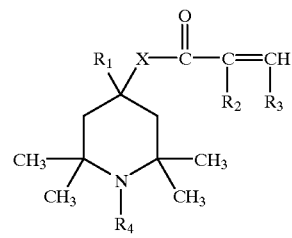

(wherein $R_1$ is H or CN; $R_2$ and $R_3$ respectively are H, $CH_3$, or $C_2H_5$, with $R_2$ and $R_3$ being same as or different from each other; $R_4$ is alkyl group having a carbon number ranging between 1 and 18 or —CO—C($R_2$)=CH($R_3$) [$R_2$ and $R_3$. respectively are H, $CH_3$ or $C_2H_5$, with $R_2$ and $R_3$ being same as or different rom each other]; and X is a nitrogen or oxygen atom).

Incidentally, if X is a nitrogen atom, there is provided an amino group, hich may be either —NH— or —NR—(R is lower alkyl group).

It is believed that the improvement of the weatherability is attributable mainly to the nitrogen atom to which $R_4$ of the compound represented by the above chemical formula 4 is an alkyl group.

Further, preferably, a monomer containing the alkoxysilyl group is represented by the following chemical formula (chemical formula 5):

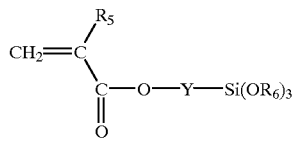

(wherein $R_5$ is H or $CH_3$; $R_6$ is an alkyl group having a carbon number ranging between 1 and 3; Y is an alkylene group having a carbon number ranging between 1 and 6).

Incidentally, in the above total three units of $R_6$ may be same as or different from one another.

By copolymerization of this monomer containing the alkoxysilyl group, it is believed that the formation of cross linking among the resin binder molecules mainly contributes to the improvement of the weatherability, the anit-solvent resistance, and so on.

Preferably, a monomer containing the ultra-violet absorbent group employed in the present invention is represented by the following chemical formula (chemical formula 6):

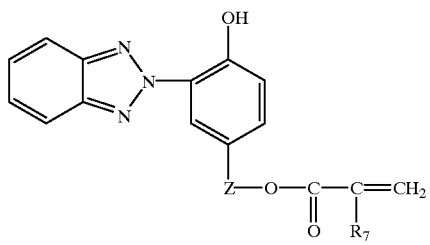

(wherein $R_7$ is H or $CH_3$; Z is an alkylene group having a carbon number ranging between 1 and 6).

It is believed that the weatherability of the resin emulsion of the invention may be significantly improved through absorption of ultra-violet ray due to the conjugated double bond in the molecule represented by the formula 6 in combination with the above-described effect of the monomer containing the light stabilizing group.

The component (a) which may be employed preferably as the monomer containing the light stabilizing group in the present invention illustratively includes esters or amides formed from acrylic acid, methacrylic acid, or crotonic acid with hydroxyl group or amino group of: 4-hydroxy-2,2,6,6-tetramethylpiperizine; 4-amino-2,2,6,6-tetramethylpiperizine; 4-hydroxy-1,2,2,6,6-pentamethylpiperizine; 4-amino-1,2,2,6,6-pentamethyl-piperizine; 4-amino-4-cyano-2,2,6,6-tetramethylpiperizine; 1-(metha)acryloyl-4-hydroxy-2,2,6,6-tetramethylpiperizine; 1-crotonoyl4-hydroxy-2,2,6,6-tetra-methylpiperizine, and so on. These compounds may be used singly or in combination of two or more members.

The component (b) which may be employed preferably as the monomer containing the alkoxysilyl group illustratively includes: vinyltrimethoxysilane; vinyltriethoxysilane; vinyltris (β-methoxyethoxy) silane; γ-methacryloxypropyltrimethoxysilane and so on. In particular, γ-methacryloxypropyltrimethoxysilane, a monomer, in which $R_5$ is $CH_3$ and $R_6$ is methyl group, and Y is $CH_2$—$CH_2$—$CH_2$-(propylene group) in the chemical formula 5 specified above, is preferred in the respects of performances, cost and so on.

The monomer, employed by the present invention, to be copolymerized with the above-described components: i.e. (a) the monomer containing the light stabilizing group, (b) the monomer containing alkoxysilyl group as well as with the further component (c), the monomer containing the ultra-violet light absorbent group, to be used depending on the necessity, generally comprises (metha)acrylic monomer. Here, the (metha)acrylic monomer refers to monomers including either one or both of derivatives based on acrylic acid and derivatives based on methacrylic acid.

In the present invention, copolymerization with other ultra-violet absorbent monomers for improving durability against ultra-violet ray exposure are also preferred. As such monomers, 2-hydroxy4-[3-(metha) acryloxy-2-hydroxypropoxy] benzophenone, 2,2'-dihydroxy-4-[3-(metha)acryloxy-2-hydroxypropoxy] benzophenone and so on, may be cited.

Typical examples of the (metha) acrylic acid monomer are acrylic acid alkyl ester, and methacrylic acid alkyl ester. More specifically, the following compounds may be cited.

As the acrylic acid alkyl ester, it is possible to employ methyl acrylate, ethyl acrylate, n-butyl acrylate, i-butyl acrylate, t-butyl acrylate, 2-ethyhexyl acrylate, isobomyl acrylate and so on. Further, as the methacrylate (ester), it is possible to use methyl methacrylate, ethyl methacrylate, butyl methacrylate, 2-ethylhexyl methacrylate, lauryl methacrylate, isobomyl methacrylate, tetrahydrofurfuryl methacrylate and so on. These compounds may be used singly or in combination of two or more members.

Monomers other than the (metha)methacrylate monomers may be also used as raw material of the paint resin of the present invention depending on the necessity. Specifically, the following monomers may be cited:

(1) aromatic monomers such as styrene, vinyl toluene, α-methyl-styrene and so on;

(2) vinyl esters such as vinyl acetate or the like;

(3) halogen-containing monomers such as vinyl chloride, vinylidene chloride or the like;

(4) vinyl ethers;

(5) cyano group-containing monomers such as acrylonitrile or the like;

(6) nitrogen-containing monomers such as N-dimethylaminoethyl (metha) acrylate, 4-vinylpyridine, vinylimidazole, and so on.

Further, in combination with such mono-functional monomer as cited above, depending on required paint properties, it is further possible to use a monomer which may contribute to the formation of cross linking structure, such as divinylbenzene, diallyl phthalate, ethylene glycol dimethacrylate or the like.

Of these monomers, use of the aromatic monomer, styrene in particular, it is preferred due to lower cost, good compatibility with the other components, contribution to improvement of the water resistance of the resultant film and the like.

In addition to the monomers excluding the (metha) acrylate monomers described above, monomers having such functional group as OH group, COOH group, sulfonic acid group or the like may be copolymerized also.

As such monomers containing functional group, the following may be cited:

a) monomers containing OH group: hydroxyethyl (metha) acrylate, hydroxylpropyl (metha) acrylate, allyl alcohol, caprolactone modified hydroxy (metha) acrylate (manufactured by Daicel Chemical Industries Ltd.), mono (metha) acrylate of bishydroxyethyl phthalate;

b) mononomers containing COOH group: acrylic acid, methacrylate acid, crotonic acid, itaconic acid, maleic acid, maleic anhydride, and so on;

c) monomers containing sulfonic acid: vinyl sulfonic acid, styrene sulfonic acid, sulfoethyl (metha) acrylate and so on;

d) acidic phosphate monomers: 2-(metha)acryloyloxyethyl acid phosphate; 2-(metha)acryloyloxypropyl acid phosphate; 2-(metha)acryloyloxy-3-chloropropyl acid phosphate; diphenyl 2-(metha)acryloyloxyethyl phosphate, and so on;

e) monomers containing glycidyl group: glycidyl (metha) acrylate and so on.

As the polymerization initiator employed in the synthesis of the paint resin of the invention, any of those well-known in the art may be employed. Specifically, water-insoluble initiators such potassium persulfate, ammonium persulfate or the like are preferred. Yet, water-insoluble initiators such as azobisisobutylotrie, benzoyl peroxide, ME peroxide, t-butylhydroperoxide or the like may be employed also. Further, redox type catalyst comprising e.g. a combination of radical generator and a sulfite may be employed as well. Moreover, these persulfates, peroxide in combination with metal ions, and reducing agents such as L-ascorbic acid, L-sorbic acid and so on may be employed also.

In the emulsion polymerization, it is preferred that chain transfer agents be used for molecular weight adjustment. And, any compounds well-known in the art may be employed as such chain transfer agent. Typical examples are mercaptans such as n-dodecyl mercaptan, laurylmethyl mercaptan and so on.

In order to emulsify the monomers which constitute the resin, emulsifiers may be employed, depending on the necessity. As such emulsifier, surfactants well-known in the art may be used. Also, for forming protective colloid, water-soluble polymer may be used. And, it is also preferred that such compounds illustratively include cellulose derivatives such as methyl cellulose, hydroxyethyl cellulose, carboxymethyl cellulose or the like and there may be used such compounds for forming the protective colloid including water-soluble polyurethane resin, water-soluble acrylic resin, polyvinyl pyrrolydone, polyvinyl alcohol and the like.

To the resin emulsion of the present invention, during or after the manufacture thereof, it is possible to add such additive type anti-weathering agent as the light stabilizing agent, ultra-violet absorbent, or anti-oxidizing agent. These additive type anti-weathering agents will gradually bleed out as described hereinbefore and will effuse due to rain or the like. Therefore, these agents will not contribute to improvement of long-term weatherability, but will be effective at an earlier time. In particular, these agents can be expected to achieve an 'auxiliary effect' for prolonging the effect of the above-described monomer unit having the anti-weathering agent copolymerized into the resin emulsion.

EXAMPLES

Next, examples of the present invention will be described in details.

Synthetic Example

The method of synthesizing the resin emulsion is as follows. Incidentally, in the following discussion, the weight parts will be represented simply as 'parts'.

Into a four-necked flask equipped with an agitator, a thermometer, a reflux condenser, and a nitrogen-introducing tube, 60 parts of water and 2.0 parts of reactive surfactant, New Frontier A-229E (manufactured by Dia-ichi Kogyo Seiyaku Co. Ltd.) were introduced and heated under stirring with introduction of nitrogen gas to adjust the temperature of the liquid to 75° C.

Under the above condition, 5% of the emulsifier liquid containing the monomers identified in the following (Table 1) and 10% of the aqueous initiator solution were added. After stirring, the remaining portions of the emulsifier liquid and aqueous initiator solution were dropped respectively in three hours and reacted. Thereafter, completing reaction was effected for one hour at the same temperature.

The resultant emulsion was cooled and then added with 0.25 part of aqueous ammonia, whereby emulsified resin emulsion having two-layer structure was obtained.

As the component (a) of the invention, (a-1) 4-methaclyoxy-2,2,6,6-tetramethylpiperidinyl methacrylate and (a-2) N-methyl-2,2,6,6-tetramethylpiperidinyl methacrylate were used; and as the component (b), (b-1) γ-methacryloxypropyltrimethoxysilane was employed; and as the component (c), 2-(2'-hydroxy-5'-methacryloxyethylphenyl)-2H-benzotriazole was used, respectively.

TABLE 1

| components | examples | | | | | control examples | | |
|---|---|---|---|---|---|---|---|---|
| | 1 | 2 | 3 | 4 | 5 | 1 | 2 | 3 |
| monomer components | | | | | | | | |
| (a-1) | 0.5 | 0.5 | 2.5 | 0.5 | 2.5 | | 0.5 | 2.5 |
| (a-2) | | 0.5 | | 0.5 | | | 0.5 | 2.5 |
| (b-1) | 1.0 | 1.0 | 1.0 | 2.0 | 5.0 | | | |
| (c-1) | | | | 1.0 | 2.0 | 1.0 | | |
| styrene | 10 | 10 | | | | 10 | 10 | |
| methyl methacrylate | 50 | 45 | 60 | 58 | 50.5 | 50 | 45 | 60 |
| n-butyl acrylate | | 10 | | | | | 10 | |
| 2-ethylhexyl acrylate | 37.5 | 32 | 33 | 37 | 39 | 38 | 33 | 34 |
| acrylic acid | 1.0 | 1.0 | 1.0 | 1.0 | 1.0 | 1.0 | 1.0 | 1.0 |
| New Frontier A-229 E | 2.0 | 2.0 | 2.0 | 2.0 | 2.0 | 2.0 | 2.0 | 2.0 |

TABLE 1-continued

|  | examples | | | | | control examples | | |
|---|---|---|---|---|---|---|---|---|
| components | 1 | 2 | 3 | 4 | 5 | 1 | 2 | 3 |
| water | 15 | 15 | 15 | 15 | 15 | 15 | 15 | 15 |
| initiators | | | | | | | | |
| potassium persulfate (KPS) | 0.2 | 0.2 | 0.2 | 0.2 | 0.2 | 0.2 | 0.2 | 0.2 |
| water | 10 | 10 | 10 | 10 | 10 | 10 | 10 | 10 |

Method of Evaluating Weatherability

Using the emulsion obtained from the synthetic example described above, paint was prepared according to the composition shown in the following Table 2.

TABLE 2

| compounding ingredient | compounding ratio |
|---|---|
| emulsion (example, control example) | 100.0 parts |
| HEC SP-600 (Daicel Chemical Industries Co., Ltd.) | 0.1 part |
| water | 5.0 parts |
| ethylene glycol | 1.0 part |
| 4% tripolyphosphate soda | 3.0 parts |
| Primal 850 (Rohm & Haas) | 0.2 part |
| rutile type titanium dioxide | 30.0 parts |
| butyl cellosolve | 12.0 parts |
| total | 151.3 parts |

The resultant emulsion was applied on a state plate so as to be a dry film in about 100 μm thickness. And, this was dried for 7 (seven) days at 50° C., thus a test piece was obtained. Then, this test piece was subjected to an exposure test using the sunshine weather meter. After the lapse of 300 hours, the condition of the film was evaluated for the gloss-retaining ratio (%) using a gloss meter and the discoloration resistance: ΔE, was evaluated using a differential colorimeter, respectively.

Water Blushing-Resistance Test

To 100 parts of the emulsion obtained from the sample synthetic example described above, 10 parts of butyl cellosolve was added to obtain a test liquid. And, this test liquid was applied, using an applicator, on a glass plate so as to be a dry film in about 20 μm in thickness and then dried for 10 minutes at 80° C., whereby a test piece was obtained. Then, this test piece was dipped in water at 20° C. After 7 (seven) days, degree of whiteness developed was evaluated by visual observation.

The evaluation results are represented as follows.

⊚: no change
◯: slight whiteness
66 : overall whiteness recognized
X: complete whiteness The above results are summarized in the following Table 3.

TABLE 3

|  | examples | | | | | control examples | | |
|---|---|---|---|---|---|---|---|---|
|  | 1 | 2 | 3 | 4 | 5 | 1 | 2 | 3 |
| gloss retention ratio | >80 | >80 | >80 | >80 | >80 | 65 | 40 | 60 |
| (%) discoloration resistance (ΔE) | <1 | <1 | <1 | <1 | <1 | <1 | 2 | 4 |
| water-blushing resistance | ⊚ | ⊚ | ◯ | ⊚ | ⊚ | ◯ | Δ | Δ |

As described above, according to the present invention, there has been achieved a paint resin emulsion capable of forming paint film having superior gloss-retaining ability and anti-discoloring ability exhibited in the exposure test using the sunshine weather meter while achieving also the solution resistance, cracking resistance and blister resistance all to satisfactory levels. Further, the paint using the resin emulsion of the present invention is superior also in the workabilities such as the pigment dispersion stability, applicability or building performance.

What is claimed:

1. An aqueous paint composition which after film formation exhibits improved weatherability, said paint composition comprising an aqueous emulsion polymer which comprises the reaction product of
    (a) 80 to 99.8 weight percent of at least one monomer selected from the group consisting of an acrylic acid, methacrylic acid, ester of acrylic acid, ester of methacrylic acid, and combinations thereof;
    (b) 0.1 to 10 weight percent of a monomer containing a light stabilizing group; and
    (c) 0.1 to 10 weight percent of a monomer containing an alkoxysilyl group,
wherein the weight percents are based on the total weight of the polymer.

2. The paint composition according to claim 1 wherein the monomer containing a light stabilizing group has the chemical formula

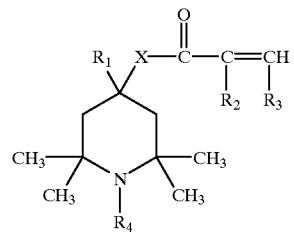

wherein $R_1$ is H or CN; $R_2$ and $R_3$ are independently selected from the group consisting of H, $CH_3$, $C_2H_5$; $R_4$ is an alkyl group having 1 to 18 carbon atoms or —CO—C($R_2$)=CH($R_3$); and X is N or O.

3. The paint composition according to claim 1 wherein the monomer containing an alkoxysilyl group has the chemical formula

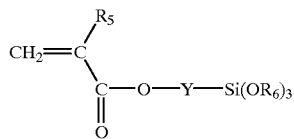

wherein $R_5$ is H or $CH_3$; $R_6$ is an alkyl group having 1 to 3 carbon atoms; and Y is an alkylene group having 1 to 6 carbon atoms.

4. An aqueous paint composition which after film formation exhibits improved weatherability, said paint composition comprising an aqueous emulsion polymer which comprises the reaction product of
  (a) 70 to 99.7 weight percent of at least one monomer selected from the group consisting of an acrylic acid, methacrylic acid, ester of acrylic acid, ester of methacrylic acid, and combinations thereof;
  (b) 0.1 to 10 weight percent of a monomer containing a light stabilizing group;
  (c) 0.1 to 10 weight percent of a monomer containing an alkoxysilyl group; and
  (d) 0.1 to 10 weight percent of a monomer containing an ultra-violet absorbent group, wherein the weight percents are based on the total weight of the polymer.

5. The paint composition according to claim 4 wherein the monomer containing an ultra-violet absorbent group has the chemical formula

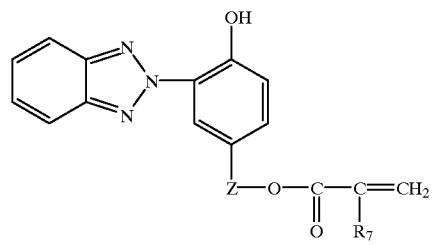

wherein $R_7$ is H or $CH_3$; and Z is an alkylene group having 1 to 6 carbon atoms.

* * * * *